July 10, 1951     W. CHANDLER     2,559,757
TUBE CLEANING BRUSH
Filed March 12, 1946
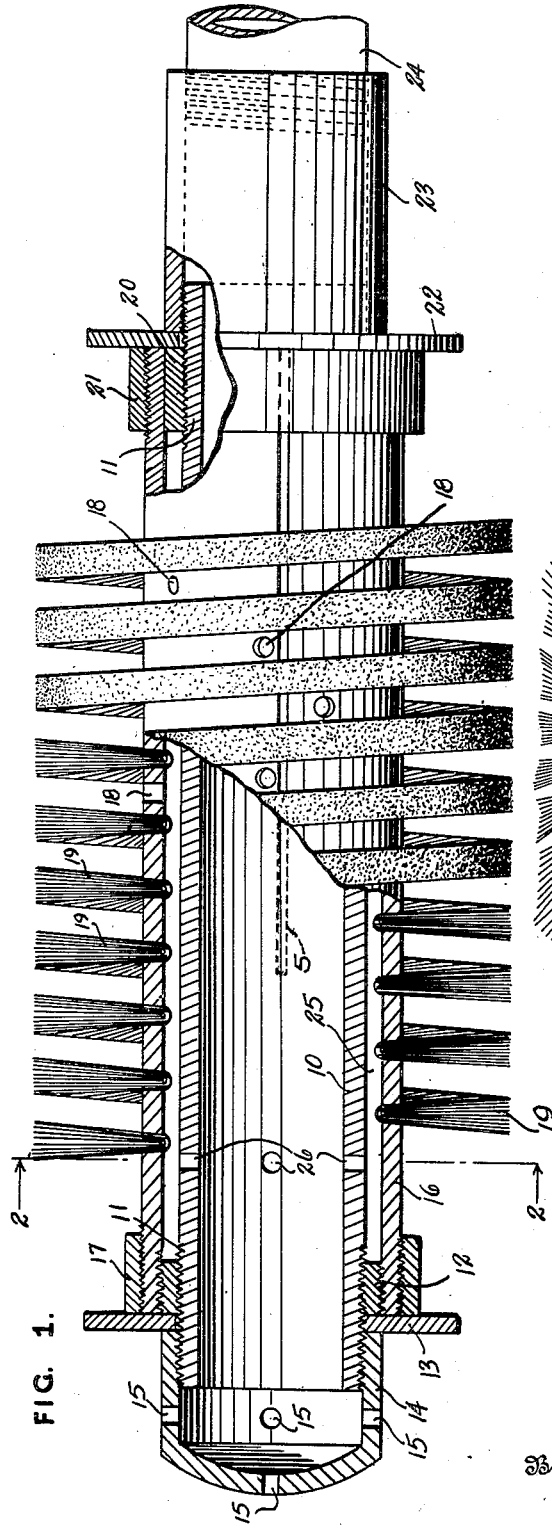
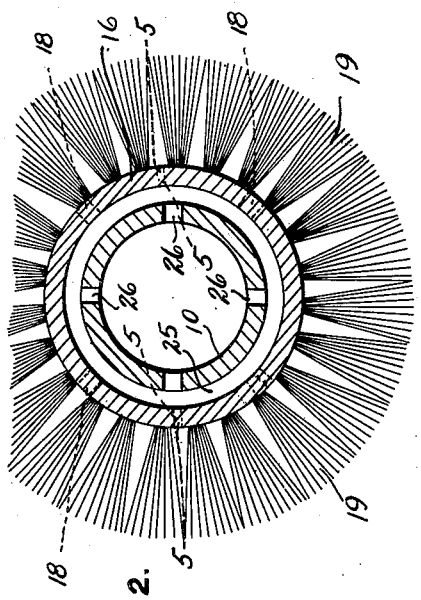
FIG. 1.
FIG. 2.
Inventor
WILLIAM CHANDLER,
Attorneys Patented July 10, 1951

2,559,757

UNITED STATES PATENT OFFICE 2,559,757

TUBE CLEANING BRUSH

William Chandler, Pittsburg, Tex., assignor of one-half to W. Clyde Hull, Pittsburg, Tex.

Application March 12, 1946, Serial No. 653,784

1 Claim. (Cl. 15—104.2)

My invention relates to brushes and more particularly to brushes adapted to clean the inside of boiler flues and the like.

The object of my invention is to produce a brush to clean boiler flues simultaneously with steel bristles and steam or liquid under pressure.

Other objects of my invention may appear in the following specification describing my invention with reference to the accompanying drawing illustrating a preferred embodiment of my invention. It is however to be understood that my invention is not to be limited or restricted to the exact construction and combination of parts described in the specification and shown in the drawing but that such changes and modifications can be made which fall within the scope of the claim appended hereto.

In the drawing:

Figure 1 is an illustration of the brush forming the subject matter of my invention, partly shown in section and partly in elevation, and Figure 2 is a sectional view taken on line 2—2 in Figure 1.

Referring now in detail to the drawing the brush according to my invention has an inner pipe 10 provided on each side with an outer thread 11.

On one end of the pipe 10 a short nipple 12 is screwed onto the pipe so that the end of the pipe 10 extends beyond the nipple 12. The hole of a washer 13 is enlarged so that it can receive the end of the pipe 10 extending beyond the nipple 12. A cap 14 has an inner thread and is screwed onto the pipe 10 clamping the washer 13 in position between the nipple 12 and the cap 14. The cap has a plurality of holes 15 therein.

The nipple 12 has also outer threads thereon. An outer pipe 16 is threaded inside and outside on one end. A nipple 17 is screwed onto this end of the pipe 16 so that the outer ends of the nipple 17 and the pipe 16 coincide and the pipe 16 is then screwed onto the nipple 12 so that the end of the pipe abuts the washer 13.

The pipe 16 forms a hub for the brush and is provided with a plurality of holes 18 and supports a plurality of steel bristle tufts 19 extending outwardly and radially therefrom. The pipe 16 is threaded on its circumference adjacent its other end, and is slotted for half of its length by sawing into it from this end forming slots 5.

A nipple 20 is screwed onto the other end of the inner pipe 10 so that the end of pipe 10 which forms a supporting sleeve for the brush head extends beyond the nipple. The split end of the outer pipe 16 is clamped onto the nipple 20 by screwing a nipple 21 onto this end. The ends of pipe 16 and the nipples 20 and 21 coincide. The hole of a washer 22 is enlarged so that it can receive the pipe 10 and be placed on the pipe abutting the ends of pipe 16 and nipples 20 and 21. A nipple 23 is screwed onto the pipe 10 and clamps the washer 22 securely in place. The washers 13 and 22 provide locating flanges at the ends of the brush. The nipple 23 extends beyond the end of pipe 10 so that it can receive any desired length of pipe 24 to form a handle for the pipe brush according to my invention.

As shown in the drawing and described above a space 25 is formed between the inner pipe 10 and the outer pipe 16. A plurality of holes 26 connect the interior of the pipe 10 with the space 25.

When the brush according to my invention is in use, the handle pipe 24 is connected with a source of steam or liquid under pressure (not shown) by means of a flexible tube (not shown). It is then pushed into the boiler tube in the usual manner, where the bristles 19 will escape the wall of the tube to be cleaned. At the same time steam or liquid under pressure will enter the space 25 between the inner and outer pipe through the holes 26 in pipe 10 and will pass from there through the holes 15 in the cap 14 and the holes 18 and the slots in the outer pipe 16 against the tube wall facilitating the cleaning thereof.

Having described my invention, what I claim and desire to secure by Letters Patent is:

A brush device for cleaning the inside of tubes, comprising an inner elongated cylindrical pipe having a plurality of spaced radial openings and being externally screw threaded at both ends, an internally and externally screw threaded nipple mounted upon one externally screw threaded end of said pipe, a nipple having internal screw threads only mounted upon the other screw threaded end of the pipe, an outer elongated cylindrical pipe engaging over the nipples and having its ends flush with the outer ends of the nipples, the outer pipe being internally and externally screw threaded at its end adjacent to the internally and externally screw threaded nipple and externally screw threaded only at its other end, the outer pipe being provided with a spirally arranged group of radial openings arranged over substantially the entire length of the outer pipe, radially extending bristles secured within the spirally arranged group of openings and forming a substantially continuous elongated cylindrical spiral-shaped brush, the outer pipe being provided with a plurality of radial openings between the spiral convolutions of the brush and axially extending slots formed in the end of the outer pipe which is externally screw threaded only, said slots extending near the longitudinal center of the outer pipe, the outer and inner pipes and the nipples forming an elongated annular space between the outer and inner pipes which is closed at both ends by the nipples, outer internally screw threaded nipples mounted upon the externally screw threaded ends of the outer pipe and having their outer ends flush with the outer ends of the first-named nipples and with the ends of the outer pipe, one of said outer nipples serving to clamp the end of the outer pipe having the slots against the adjacent nipple of the inner pipe, each of the ends of said inner pipe extending beyond and spaced from the adjacent end of said outer pipe, a washer mounted upon each of the projecting ends of said inner pipe and engaging the outer ends of the first and second named nipples and the adjacent ends of the outer pipe, the outside diameter of the washers being slightly less than the outside diameter of the brush, an internally screw threaded cap mounted upon one of the projecting ends of said inner pipe and serving to clamp the adjacent washer against the adjacent nipples and outer pipe, and an internally threaded sleeve mounted upon the other of the projecting ends of said inner pipe and serving to clamp the adjacent washer against the adjacent nipples and outer pipe and adapted for attachment to a source of steam supply.

WILLIAM CHANDLER.

REFERENCES CITED

The following references are of record in the file of this patent:

UNITED STATES PATENTS

| Number | Name | Date |
|---|---|---|
| 1,199,780 | Goodrich | Oct. 3, 1916 |
| 1,869,730 | Antle | Aug. 2, 1932 |
| 2,367,900 | Stine | Jan. 23, 1945 |

FOREIGN PATENTS

| Number | Country | Date |
|---|---|---|
| 280,737 | Germany | Nov. 27, 1914 |
| 474,170 | Great Britain | Oct. 27, 1937 |